(12) United States Patent
Lewis et al.

(10) Patent No.: US 6,176,660 B1
(45) Date of Patent: Jan. 23, 2001

(54) RELEASABLE FASTENER WITH LATERAL STABILIZING BRACE MEMBERS AND LATCH LEGS CARRYING FASTENER INSERTION GUIDE

(75) Inventors: Jeffrey C. Lewis, Rochester Hills; James F. Fleck, Warren; Jordan M. Stevenson, Walled Lake, all of MI (US)

(73) Assignee: TRW Inc., Cleveland, OH (US)

( * ) Notice: Under 35 U.S.C. 154(b), the term of this patent shall be extended for 0 days.

(21) Appl. No.: 09/122,211

(22) Filed: Jul. 24, 1998

(51) Int. Cl.[7] ..................................................... F16B 13/06
(52) U.S. Cl. .................................................. 411/45; 411/41
(58) Field of Search .................................. 411/41, 45–48, 411/57.1, 60.1, 508, 913

(56) References Cited

U.S. PATENT DOCUMENTS

| Re. 33,809 | * | 1/1992 | Okeda | 411/41 |
|---|---|---|---|---|
| 4,276,806 | * | 7/1981 | Morel | 411/46 |
| 4,571,134 | * | 2/1986 | Berlinger | 411/41 |
| 4,610,587 | * | 9/1986 | Wollar | 411/45 |
| 4,981,322 | * | 1/1991 | Dowd | 411/45 |
| 5,358,299 | | 10/1994 | Seto . | |
| 5,507,545 | | 4/1996 | Krysiak . | |
| 5,560,575 | | 10/1996 | Krysiak . | |
| 5,560,669 | * | 10/1996 | Gute | 411/45 |
| 5,567,098 | | 10/1996 | Gordon . | |

* cited by examiner

Primary Examiner—Flemming Saether
(74) Attorney, Agent, or Firm—Fay, Sharpe, Fagan, Minnich & McKee, LLP

(57) ABSTRACT

A fastener assembly is integrated with a motor vehicle component such as an assist strap handle in a manner to allow the assist strap to be releasably mounted to overhead or other structural vehicle body panels. The fastener assembly includes a first set of resilient latch legs that extend from a main body of the fastener and are adapted to engage in a motor vehicle body panel opening. The latch legs are interengaged at their respective termini opposite the fastener body to facilitate insertion into the panel opening by preventing the latch legs from deflecting away from one another during movement through the opening. A second set of semi-rigid lateral support legs carried on the main body permit the fastener construction to be preassembled to another vehicle component, such as a headliner, prior to the time that the assist strap component and the headliner component are joined to the vehicle body panel. When assembled, the support legs engage the body panel to provide relative lateral support between the fastener assembly and the panel to prevent assist strap rocking when tugged by an occupant of the vehicle.

21 Claims, 4 Drawing Sheets

RELEASABLE FASTENER WITH LATERAL STABILIZING BRACE MEMBERS AND LATCH LEGS CARRYING FASTENER INSERTION GUIDE

BACKGROUND OF THE INVENTION

The subject invention is directed toward the fastener art and, more particularly, to blind push-in type fasteners that can be released and reused.

The invention is especially well suited for incorporation into motor vehicle interior components and will be described with particular reference thereto; however, the invention is capable of broader application and can be used for a wide variety of purposes in many environments.

Push-in, molded plastic fasteners are commonly used in the automotive industry for mounting various types of components to body panels and frame members. In commonly assigned U.S. Pat. No. 5,507,545, there is disclosed a fastener assembly that can be integrally incorporated into an associated component for providing releasable mounting of the component to a body panel. The preferred form of the fastener assembly comprises spaced resilient latch legs that extend from the component to be mounted. The legs can be deflected toward and away from one another to allow their positioning in a mounting opening in a body panel or frame. After the latch legs are in the panel, a rigid pin is inserted between the legs to maintain them locked in the mounting opening. Components such as sun visor clips, coat hooks, and assist straps or handles can be mounted using this type of fastener.

These types of components are generally mounted at locations wherein they overlie a layer of resilient headliner material. Thus, the locking legs extend through aligned openings in both the headliner and the body panel. Installation of the headliner is typically effected prior to installation of the associated components. Installation of the fastener into blind panel openings, however, requires precise alignment of the locking legs with respect to the opening. It is critical to maintain alignment in order to prevent the legs from deflecting away from one another and not entering the opening properly.

In commonly assigned U.S. Pat. No. 5,567,098, a fastener assembly is provided to facilitate installation of the headliner and the associated components by allowing the component and the fastener to be preassembled into the headliner so that both the headliner and the component can be installed in the vehicle simultaneously as a unit. The fastener assembly taught there includes resilient latch legs that extend from the fastener body and are adapted to engage in a panel opening. The legs include resilient spring fingers that permit the assembly to be preassembled to a headliner prior to the time that the vehicle component and the headliner are joined to the panel.

The preconnection of the fastener assembly to the headliner makes it extremely difficult to align the latch legs with the panel opening because the bulky nature of the headliner prevents, in most cases, a clear and unobstructed view of the opening therebehind. In the event that an assembler attempts to insert the latch legs of the above fastener assembly into a panel opening while the two are misaligned, it is common that only one or neither of the latch legs actually penetrate through the opening in the panel. The remaining legs are typically deflected away from the other and bent into an ineffective position between the headliner and the vehicle body.

SUMMARY OF THE INVENTION

The subject invention provides a fastener assembly which facilitates installation of motor vehicle headliners and associated components by allowing the component and fastener to be preassembled into the headliner so that both the headliner and the component can be carried together as a single sub-assembly during shipping and then installed in the vehicle simultaneously as a unit.

The fastener assembly further facilitates installation by providing a fastener insertion guide on the terminal end of a set of fastener legs adapted to engage behind a hole provided in the motor vehicle body. The fastener insertion guide prevents the legs from spreading apart during insertion through the hole. Lateral stabilizing brace members extending from the body of the fastener assembly adjacent the latch legs enable the fastener assembly to be used in applications where the fastener is likely to experience high torque loads such as, for example, in motor vehicle pull handles, assist straps, and the like.

In accordance with a preferred aspect of the invention, there is provided a fastener assembly particularly intended for joining a first component to a panel. The assembly generally comprises a fastener body having a central opening extending therethrough from an outer first end of the main body to an inner second end thereof. A pair of spaced-apart legs extend axially from the second end of the main body on opposite sides of the central opening and terminate at an insertion guide region whereat the first pair of legs are interengaged. The pair of legs are adapted to be received in a hole in the panel and at least one of the legs is radially resilient and carries a locking member for engagement with the panel to retain the fastener body joined to the panel. A slidable pin member is disposed in the central opening of the main body for selected axial movement between and outer first position and an inner second position whereat the pin member prevents the deflection of the pair of legs in a direction toward one another to maintain the locking member engaged with the opening formed in the panel. At least one rigid brace member extends from the main body adjacent the pair of legs and is adapted to be received in a hole provided in the first component for holding the fastener assembly to the first component in a preassembled configuration. When the fastener assembly together with the first component is connected to the panel, the brace member engages the outer surface of the panel for providing relative lateral support between the fastener assembly and the panel.

In its preferred form, the fastener body can be an integrated part of a second motor vehicle component such as an assist strap, coat hook, visor clip, or the like.

Preferably, and in accordance with a more limited aspect of the invention, a pair of elongate spaced-apart resilient latch legs are provided extending axially from the second end of the main body and each carrying locking members for engagement with the panel to retain the fastener body joined to the panel. A pair of brace members are also provided on opposite sides of the central opening for holding the fastener assembly to the first component from behind, such as, for example, a motor vehicle headliner. The pair of brace members are arranged on the main body to provide relative lateral support between the fastener assembly and the panel when the fastener is connected to the panel in a final assembled state.

In accordance with a further aspect of the invention, the pair of resilient latch legs are connected together at the insertion guide region in a manner to prevent the latch legs from deflecting away from one another while the latch legs are advanced through the openings provided in the headliner and the motor vehicle panel. Preferably, the latch legs integrally connected at the insertion guide region to form a rounded guide surface between the pair of latch legs for directing the latch legs through the panel openings.

In accordance with yet a further aspect of the invention, the pair of brace members define opposite first and second laterally disposed shoulder surfaces. The first shoulder surface is adapted to engage the outer surface surrounding the hole in the motor vehicle panel for providing relative lateral support between the fastener assembly and the panel. The second shoulder surface is adapted to engage a rear surface of the first component, such as, for example, a headliner, for holding the first component to the fastener assembly when the pair of brace members are extending through an opening in the first component.

A primary object of the invention is the provision of the fastener assembly of the type described which includes an insertion guide region for preventing the latch legs from deflecting away from one another while the legs are advanced through openings in panels. The insertion guide region further preferably provides a rounded guide surface for directing the latch legs through the panel opening.

Yet another object of the invention is the provision of a fastener assembly including brace members defining shoulder surfaces adapted to engage the area surrounding the panel opening for providing relative lateral support between the fastener assembly and the panel.

A still further object of the invention is the provision of a push-in type fastener which can be incorporated into the component being mounted as an integral part thereof.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
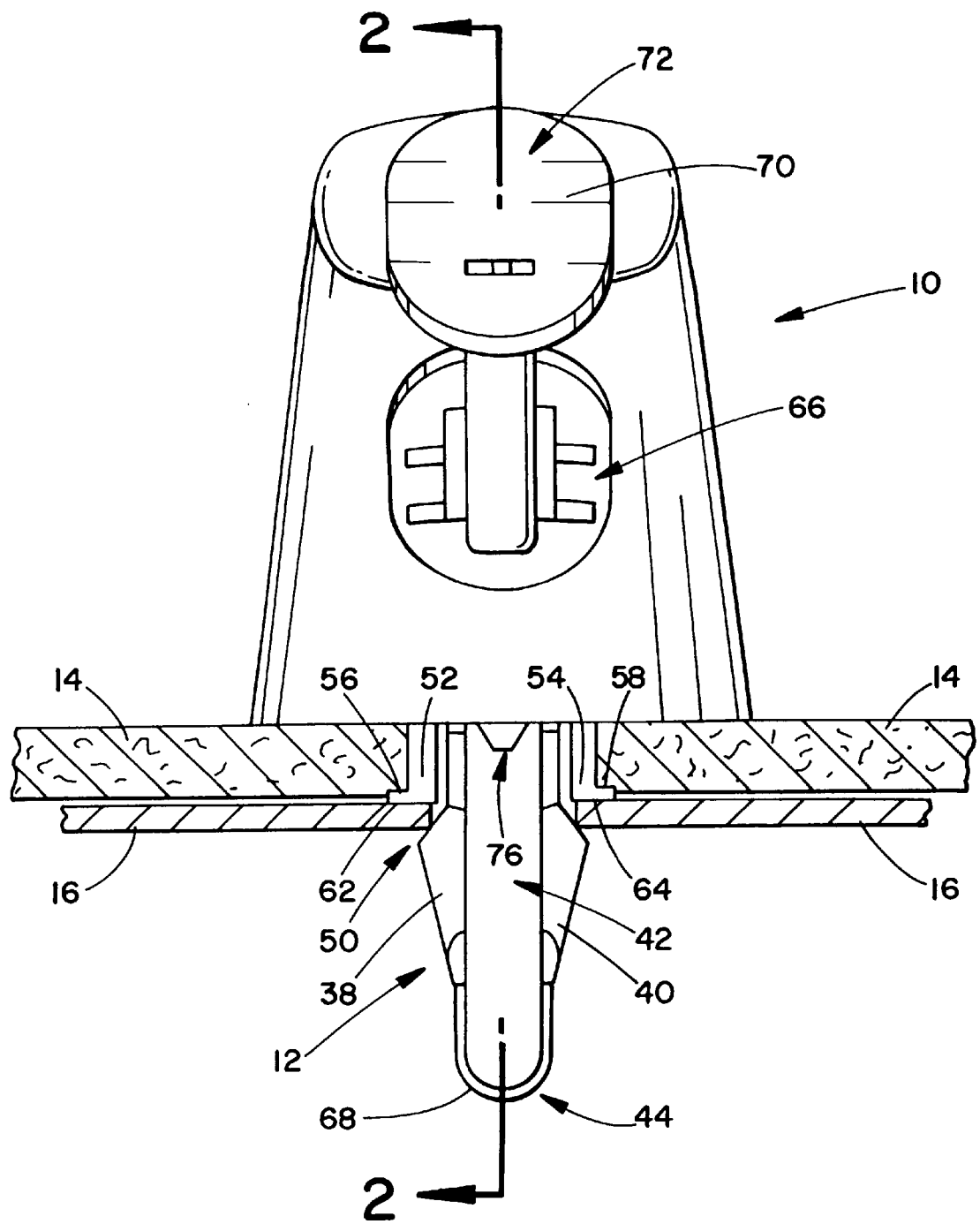
FIG. 1 is an end elevational view, partially in section, showing the improved fastener assembly of the invention integrated into a motor vehicle assist handle and mounted in position in the vehicle body.

Referring now to the drawings wherein the showings are for the purposes of illustrating the preferred embodiment of the invention only and not for purposes of limiting same, FIG. 1 best shows the overall arrangement of a motor vehicle assist handle 10 which incorporates a push-in type fastener assembly 12 formed in accordance with a preferred embodiment of the subject invention. The assist handle and fastener assembly 12 are shown in conjunction with a motor vehicle headliner 14 mounted to a vehicle body panel 16. In the subject embodiment, the assist handle 10 and the associated fastener assembly 12 are formed as injection molded plastic components but they could, however, be formed from other materials or a combination of materials by other techniques. More particularly, referring to FIGS. 2 and 5, the assist handle component 10 is generally depicted as having a arcuate main body portion 18 that extends between a pair of spaced apart terminal ends 20, 22. Each terminal end of the main body portion of the assist handle defines a flat base surface 24, 26, respectively for providing a smooth engagement interface between the assist handle and a motor vehicle headliner. A pair of fastener assemblies 12 formed in accordance with the present invention are provided at both terminal ends 20, 22 of the assist handle as shown.

Figure 3:
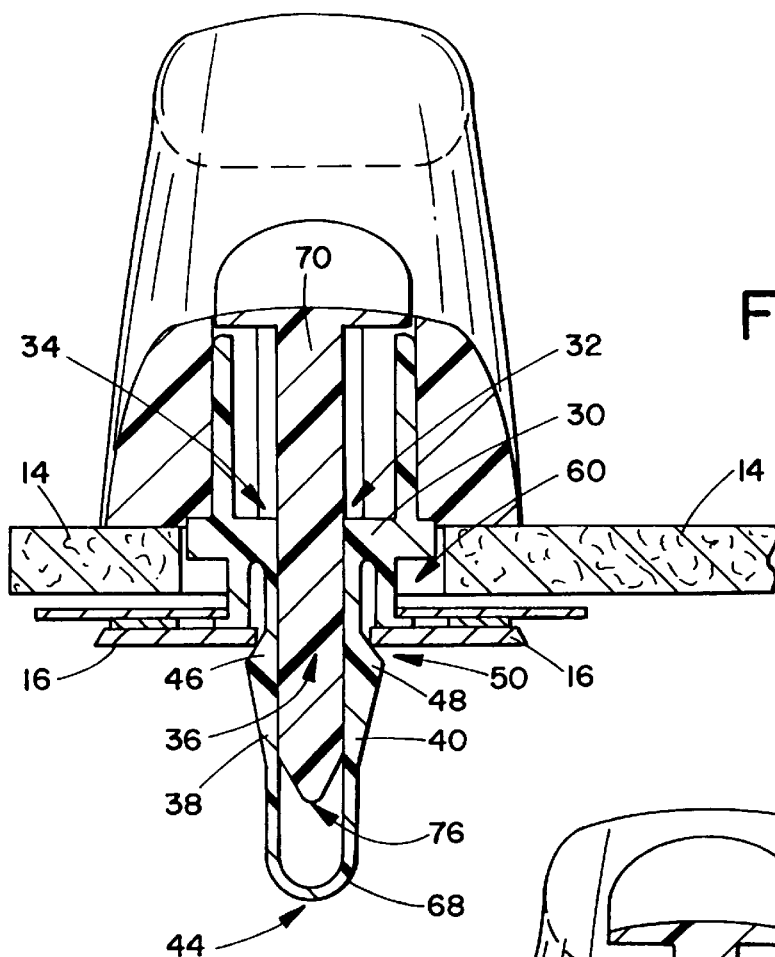
FIG. 3 is a cross-sectional view taken along line 3—3 of FIG. 2 illustrating the locking pin of the subject fastener assembly in its locked position and mounted in position in the vehicle body.
Figure 4:
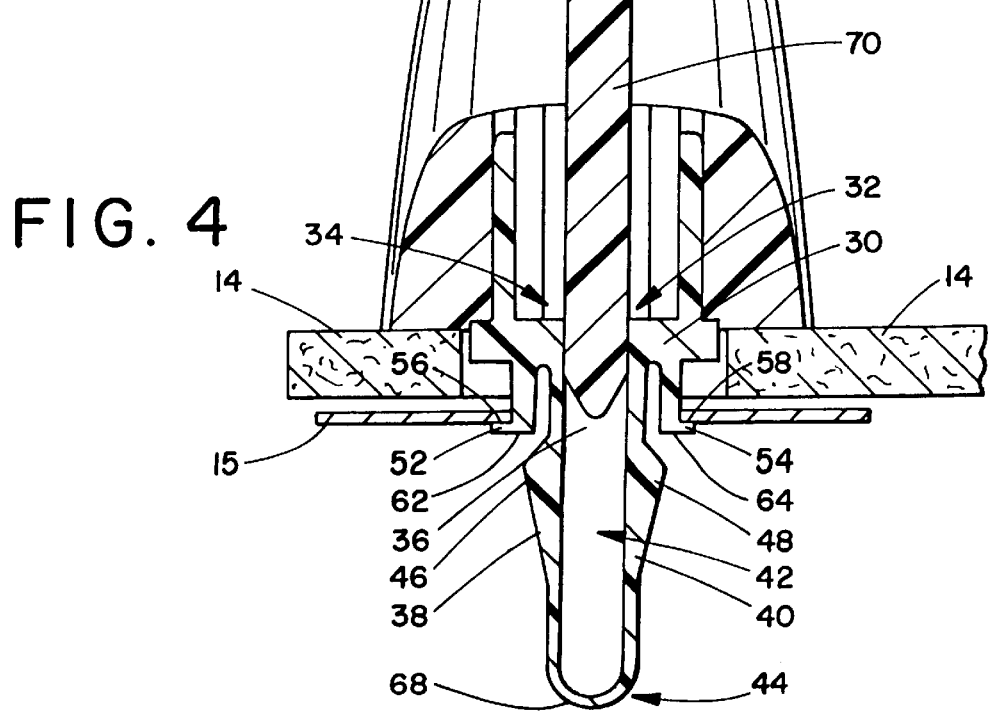
FIG. 4 is a cross-sectional view taken along line 4—4 of FIG. 2 illustrating the stabilizing brace members of the subject fastener assembly used to connect the fastener to a vehicle headliner in a pre-assembled state; and, FIG. 5 is an isometric view the subject fastener assembly integrated into a motor vehicle assist handle having an integral coat hook member.

As can best be seen in FIGS. 3 and 4, each fastener assembly 12 includes a main body 30 having a central opening 32 extending axially therethrough from an outer first end 34 of the main body to an inner second end 36 as shown. A pair of elongate resilient latch legs 38, 40 extend axially from the second end 36 of the main body 30 on opposite sides of the central opening 32. The latch legs 38, 40 are, in the subject embodiment, preferably molded integrally with the main body 30 and are space apart to define an open center area 42 which is a continuation of the central opening 32.

As shown FIGS. 1, 3 and 4, the latch legs 38, 40 are radially resilient and deflectable toward one another between the main body and an insertion guide region 44 formed at the terminal ends of the latch legs where at the latch legs are interengaged. Each of the resilient latch legs 38, 40 further have a tapered outer end and each incorporates a locking member 46, 48, respectively. The locking members 46, 48 are sized and located so as to engage behind the edge of an opening 50 formed through the body panel member 16. It is important that the size of the opening 50 is such that the locking members 46, 48 engage behind the peripheral edge of the opening and act to hold the fastener assembly 12 in position. It should also be noted that a pair of relatively rigid brace members 52, 54 extend from the main body of the fastener assembly to engage with the outer face surface of the body panel 16 and locate the panel relative to the locking members 46, 48. In this regard, it should be noted that the relationship between the base surfaces 24, 26 and the top shoulder surfaces 56, 58 of the brace members are determined by the thickness of the headliner 14. The pressure with which the base surfaces engage the headliner can, of course, be varied by varying the axial distance that the brace members 52, 54 extend. In addition, it should be noted that the headliner 14 is preferably provided with an opening 60 that is somewhat larger than the opening 50 through the vehicle body panel 16. This allows the bottom shoulder surfaces 62, 64 of the brace members 52, 54 to engage the outer surface of the body panel 16 and thereby to provide relative lateral support between the fastener assembly and the body panel.

Extending into the open center area 42 between the latch legs 38, 40 is an axially movable rigid pin member 70 which, when in the position shown in FIG. 3, functions to prevent inward deflection of the latch legs and thus retains the legs in their outer position with their locking members 46, 48 engaged behind the edge of the body panel opening 50.

Figure 5:
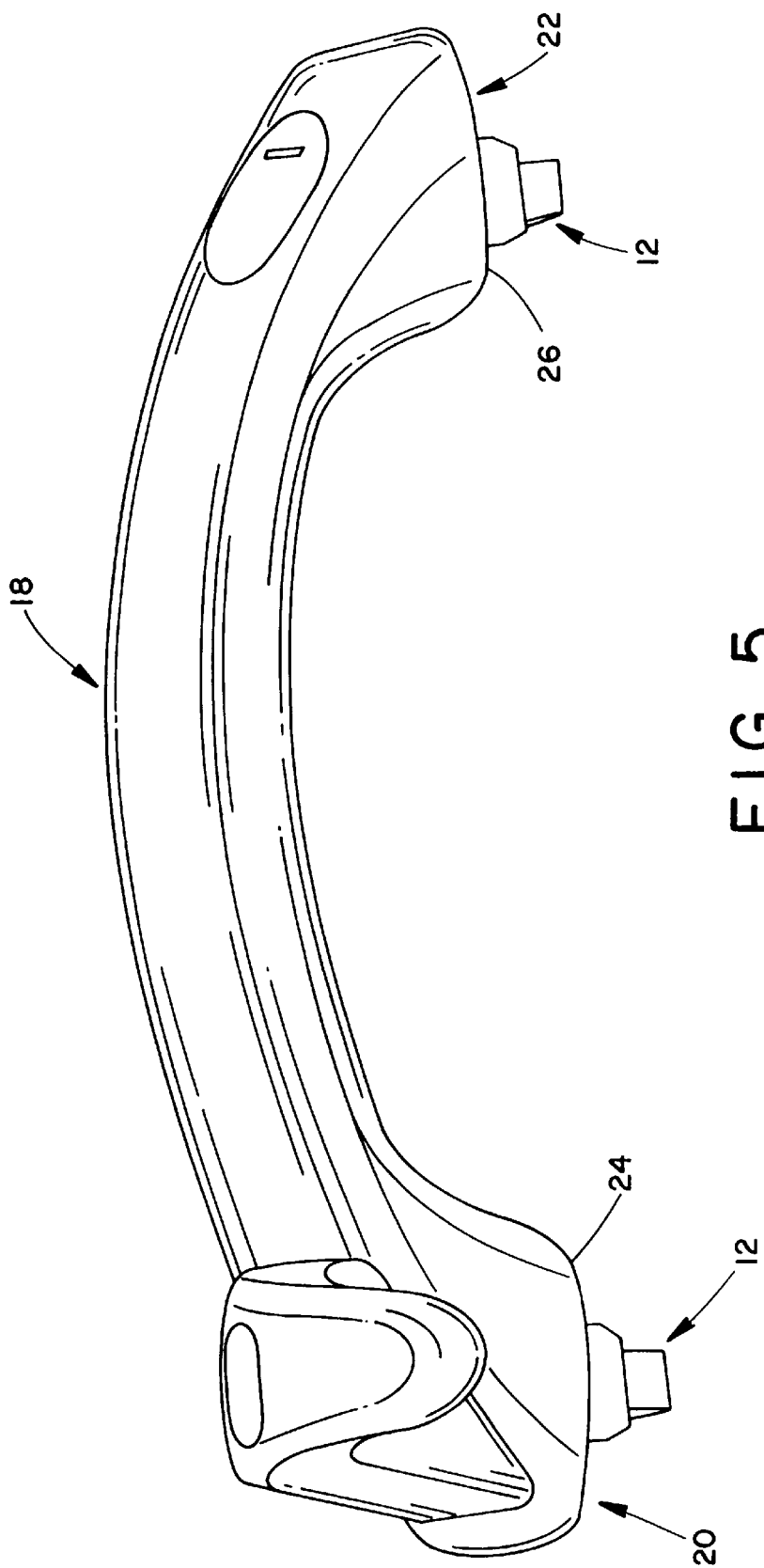

The pin member 70 could have a variety of different configurations and designs but is preferably shaped as best seen in FIGS. 1 and 5. As illustrated there, the pin member 70 is molded from plastic and includes an outer head end 72 which is sized so as to be received within a pocket area 66 formed in the body portion 18 of the assist handle when the pin is in the fully inserted position as shown in FIG. 3 and on the right in FIG. 2. The head end 72 has an outer surface portion 74 contoured to provide a smooth continuation of the surface of the assist handle 10. The lead end 76 of the pin member 70 is rounded as illustrated so that the pin member can be easily inserted into the central opening 32 in the main body 30.

The pin member 70, is as previously mentioned, arranged to be received within the open center area 42 to enter between the latch legs 38, 40 and maintain them in their outward, biased position shown engaged with the body panel 16 in FIG. 3. When the pin member is fully inserted, the lead end 76 is located at a position to hold the latch legs 38, 40 in their latched position. When the pin member is fully retracted, the lead end 76 is withdrawn from between the latch legs 38, 40 allowing them to be deflected axially inwardly to permit installation of the fastener assembly into the body panel opening 50.

The insertion guide region 44 of the invention enables easy blind installation of the fastener assembly into body panel openings by preventing the latch legs from deflecting away from one another while the latch legs are advanced through both the headliner opening 60 and the opening 50 in the body panel. The insertion guide region 44 is fashioned to form a smooth rounded guide surface 68 between the terminal ends of the pair of latch legs 38, 40 for directing the latch legs through the body panel and headliner openings 50, 60. Preferably, as illustrated best in FIGS. 1, 3, and 4, the insertion guide region integrally connects the latch legs in the form of a continuous loop of material.

Figure 2:
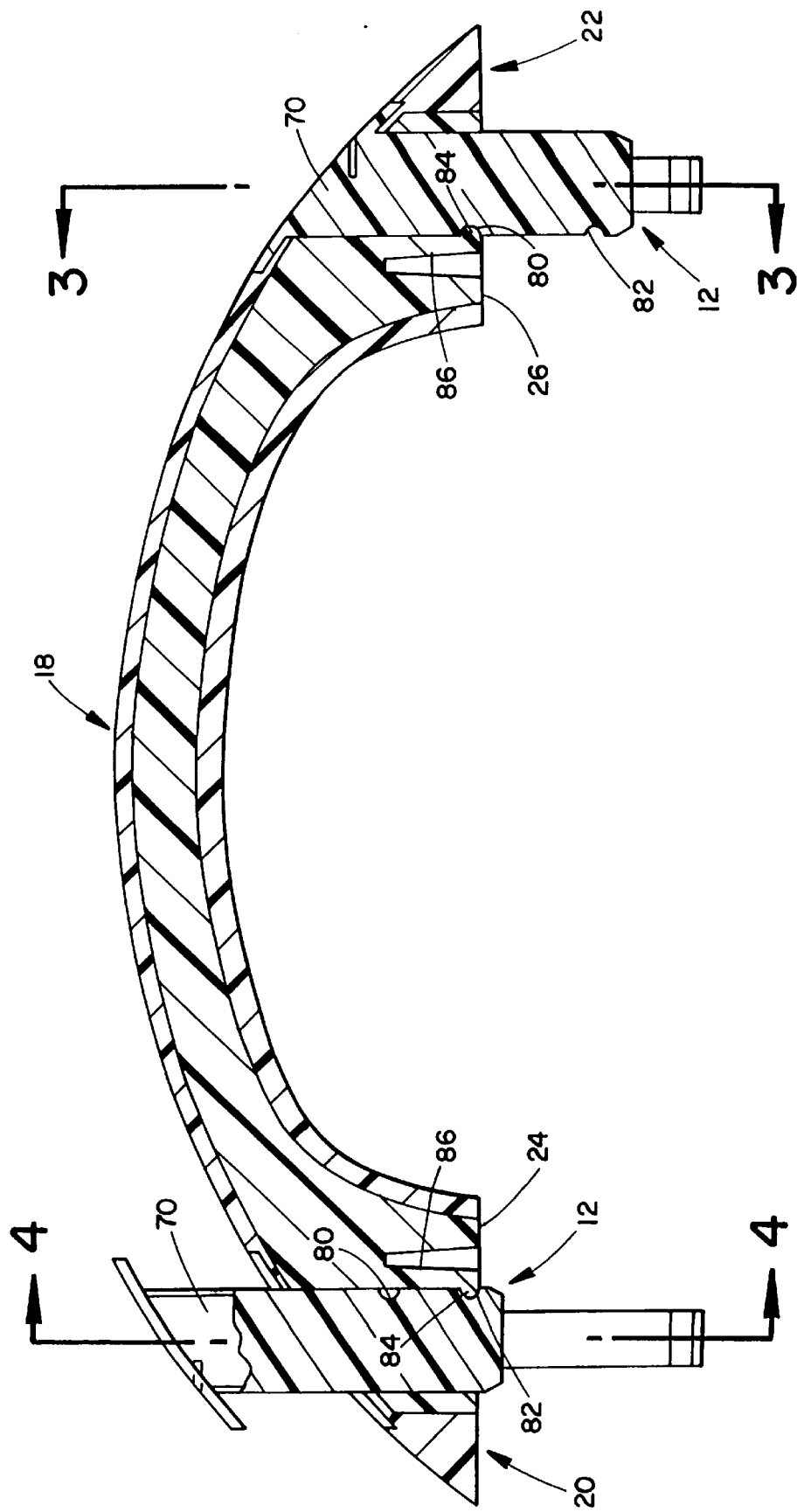
FIG. 2 is a cross-sectional view taken along line 2—2 of FIG. 1.

Turning next to FIG. 2 in particular, the pin member 70 is shown on the left end of the assist handle in its fully retracted position and, on the right end of the assist handle, in its fully inserted position. To releasably maintain the pin 70 in the fully retracted and inserted positions, there are provided suitable retaining means including a set of first and second grooves 80, 82 axially spaced apart along the pin member 70. The grooves 80, 82 are disposed on the pin member 70 and are adapted to engage a corresponding rounded pin member 84 on the terminal end of a resilient finger 86. The finger is biased so that the pin member can lodge into the first groove 80 to retain the pin member 70 in the inserted position shown on the right in FIG. 2 and to lodge into the second groove 82 to retain the pin member 70 in the retracted position shown on the left side in that Figure.

In the subject embodiment, means are provided to allow the fastener assembly 12 and the assist handle 10 to be preassembled to the headliner 14. These means can take many forms but preferably comprise the pair of brace members 52, 54. In operation, the brace members engage from behind and outwardly of the opening 60 in the headliner as best shown in FIG. 4 so as to maintain the fastener assembly 12 and the assist handle 10 in a preassembled position with the headliner 14.

The preassembled relationship is best shown in FIG. 4. A relatively rigid plastic locking plate member 15 is used to hold the fastener assembly and assist handle handle on the headliner as shown. The backing plate is provided with-a hole sized in proportion with the hole in the headliner so that the pair of brace members can be inserted therethrough and afterwards to then grip therebehind.

As can be seen in the FIG. 5 showing, the entire assist handle and associated fastener assembly can be joined to the headliner 14 to form a unitary subassembly for subsequent installation in the vehicle with the final insertion of the latch legs 38, 40 through the opening 50 in the body panel 16. The latch pin is preferably preassembled in the retracted position shown on the left and of the handle in FIG. 2. Subsequently, when the latch legs 38, 40 are forced through the opening 50 in the body panel, the pin member can subsequently be inserted into the final located position shown in FIG. 2 on the right of the handle assembly. In moving the pin member to the installed position, the latch legs 38, 40 are compressed radially inward by the sides of the body panel opening 50. In the installed position, the peripheral edge of the body panel opening 50 is held firmly between the locking members 46, 48 and the bottom shoulder surfaces 62, 64 of the brace members 52, 54. The brace members provide relative lateral support between the fastener assembly and the panel.

The invention has been described with reference to the preferred embodiment. Obviously, modifications and alterations will occur to others upon a reading and understanding of this specification, such as, for example, integrating the fastener assembly with other components and in other applications. Also, the fastener assembly can be used separate and apart from other components to connect many types of members together. It is intended to include all such modifications and alterations insofar as they come within the scope of the appended claims or the equivalents thereof.

Having thus described the invention, it is claimed:

1. A fastener assembly for joining a first component to a panel, the fastener assembly comprising:

a main body having a central opening extending axially therethrough from an outer first end of the main body to an inner second end of the main body;

a pair of elongate spaced apart resilient latch legs extending axially from the second end of the main body on opposite sides of the central opening and terminating at an insertion guide region whereat said pair of latch legs are interengaged, said pair of latch legs being deflectable between said insertion guide region and said main body in directions toward and away from one another and adapted to be selectively received into first and second openings formed in the first component and the panel respectively;

at least one locking member carried on at least one of the pair of latch legs, the at least one locking member being adapted for engagement with a peripheral edge of the second opening formed in the panel to retain the fastener body joined to the panel;

at least one relatively rigid brace member extending from the second end of the main body radially outside of at least one of said latch legs and being adapted to be selectively received into said first opening formed in the first component for holding the fastener assembly to the first component and being adapted to engage an outer surface of said panel between said first component and the panel for providing relative lateral support between the fastener assembly and the panel; and, a pin member in the central opening for selective axial movement between an outer first position and an inner second position, said pin member operable in the inner second position to selectively attach the fastener assembly to the panel by preventing deflection of the pair of latch legs in a direction toward one another.

2. The fastener assembly according to claim 1 wherein:

said at least one locking member includes first and second locking members carried on said pair of latch legs and being adapted to engage the panel to retain the fastener body joined to the panel; and, said at least one brace member includes a pair of brace members extending from the second end of the main body radially outside of at least one of said latch legs.

3. The fastener assembly according to claim 2 wherein said pair of latch legs are connected together at said insertion guide region in a manner to prevent the latch legs from deflecting away from one another.

4. The fastener assembly according to claim 2 wherein said pair of latch legs are integrally connected at said insertion guide region to form a rounded guide surface between the pair of latch legs for directing the latch legs through said first and second openings.

5. The fastener assembly according to claim 2 further comprising:
    a retention member for retaining the pin member in said outer first position and said inner second position, the retention member including at least one resilient arm extending between said latch legs and carrying an engagement bead; and,
    a pair of axially spaced apart stop notches engageable with the engagement bead of the retention member and located to define said outer first position and said inner second position.

6. The fastener assembly according to claim 2 wherein said pair of brace members define a first laterally disposed shoulder surface adapted to engage said outer surface of the panel for providing relative lateral support between the fastener assembly and the panel.

7. The fastener assembly according to claim 6 wherein said pair of brace members define a second laterally disposed shoulder surface opposite said first shoulder surface, the second shoulder surface being adapted to engage a rear surface of the first component for holding the first component to the fastener assembly.

8. The fastener assembly according to claim 7 wherein:
    said pair of brace members include a laterally extending hook member carried on an axially extending finger member;
    said first laterally disposed shoulder surface is formed on a first side of said laterally extending hook member; and,
    said second laterally disposed shoulder surface is formed on a second side of said laterally extending hook member opposite said first side.

9. The fastener assembly according to claim 8 wherein the main body is formed in a configuration of a motor vehicle pull handle.

10. The fastener assembly according to claim 6 wherein:
    said pair of latch legs include a laterally extending hook member carried on an axially extending finger member; and,
    said first laterally disposed shoulder surface is formed on said laterally extending hook member.

11. In a fastener assembly adapted for connection to a panel including a fastener body having a central opening therethrough with a pair of latch legs extending therefrom on opposite sides of the central opening, said pair of latch legs adapted for receipt in a hole in the panel, at least one of the latch legs being resilient radially of the central opening and carrying a latch portion adapted for engagement with the panel to retain the fastener body joined to the panel, and a pin member in the central opening for selective axial movement between an axially outer first position wherein said at least one resilient latch leg can deflect radially inward for removal of the fastener body from the panel and a second position axially inward of the first position wherein said at least one resilient latch leg is prevented from deflecting radially inward:
    a pair of relatively rigid brace members extending from the fastener body radially outside of said latch legs, the pair of brace members adapted to engage an outer surface of said panel on opposite sides of said hole in the panel for providing relative lateral support between the fastener assembly and the panel.

12. In the fastener assembly of claim 11, the improvement further comprising:
    said pair of latch legs being connected together in a manner to prevent the latch legs from deflecting away from one another.

13. In the fastener assembly of claim 12, the improvement further comprising:
    said pair of latch legs being integrally connected to form a rounded guide surface between the pair of latch legs for directing the latch legs into said hole in said panel.

14. In a fastener assembly adapted for connection to a panel including a fastener body having a central opening therethrough with a pair of latch legs extending therefrom on opposite sides of the central opening, said latch legs being adapted for receipt in a hole in the panel, at least one of the latch legs being resilient radially of the central opening and carrying a latch portion adapted to engage the panel to retain the fastener body joined to the panel, and a pin member in the central opening for selective axial movement between an axially outer first position wherein said at least one resilient latch leg can deflect radially inward for removal of the fastener body from the panel and a second position axially inward of the first position wherein said at least one resilient latch leg is prevented from deflecting radially inward:
    a pair of stabilizing brace members extending from the fastener body radially outside of said latch legs, the pair of stabilizing brace members being adapted to engage an outer surface of the panel and adapted to hold the panel against said latch portion to provide relative lateral support between the fastener assembly and the panel.

15. The brace members according to claim 14, wherein:
    said pair of stabilizing brace members define a first laterally disposed shoulder surface adapted to engage said panel for providing said relative lateral support between the fastener assembly and the panel; and,
    said pair of stabilizing brace members define a second laterally disposed shoulder surface opposite said first shoulder surface, the second shoulder surface being adapted to engage a rear surface of a first component for holding the first component to the fastener assembly.

16. The brace members according to claim 15, wherein:
    said pair of stabilizing brace members each include a laterally extending hook member carried on an axially extending finger member;
    said first laterally disposed shoulder surface is formed on a first side of said laterally extending hook member; and,
    said second laterally disposed shoulder surface is formed on a second side of said laterally extending hook member opposite said first side.

17. In the fastener assembly of claim 14, the improvement further comprising:
    said pair of latch legs being integrally connected at their respective terminal ends opposite said fastener body for guiding the pair of latch legs through said hole in the panel.

18. In combination with a fastener assembly selectively attachable to a panel and including a fastener body having a central opening therethrough with a pair of latch legs extending therefrom on opposite sides of the central opening, said latch legs adapted for receipt in a hole in a panel, at least one of the latch legs being resilient radially of the central opening and carrying a latch portion adapted for engagement with the panel to retain the fastener body joined to the panel and a pin member in the central opening for selective axial movement between an axially outer first position wherein said at least one resilient latch leg can deflect radially inward for removal of the fastener body from the panel and a second position axially inward of the first position wherein said at least one resilient latch leg is prevented from deflecting radially inward:

a pair of stabilizing brace members carried on the fastener body radially outside of the latch keys, the brace members adapted to selectively engage an outer surface of the panel and adapted to hold said latch portion against said panel to provide relative lateral support between the fastener assembly and the panel; and, a rounded guide surface formed between said latch legs on terminal ends of the latch legs opposite the fastener body adapted to direct the latch legs through said hole in the panel.

19. The combination according to claim 18 wherein said rounded guide surface is formed integrally with said latch legs.

20. The combination according to claim 19 wherein the fastener body is formed in a configuration of a motor vehicle pull handle.

21. The combination according to claim 20 wherein said fastener body is formed in a configuration of a motor vehicle pull handle with an integral garment hook member.

* * * * *